SHIFTABLE MAGAZINE SOUND TAPE CARTRIDGE APPARATUS

Filed Sept. 19, 1963

INVENTOR.
JERRY O. KELLEY &
EUGENE M. MILLER
BY [signature]
ATTORNEY

INVENTORS.
JERRY O. KELLEY
EUGENE M. MILLER
BY [signature]
ATTORNEY.

SHIFTABLE MAGAZINE SOUND TAPE CARTRIDGE APPARATUS
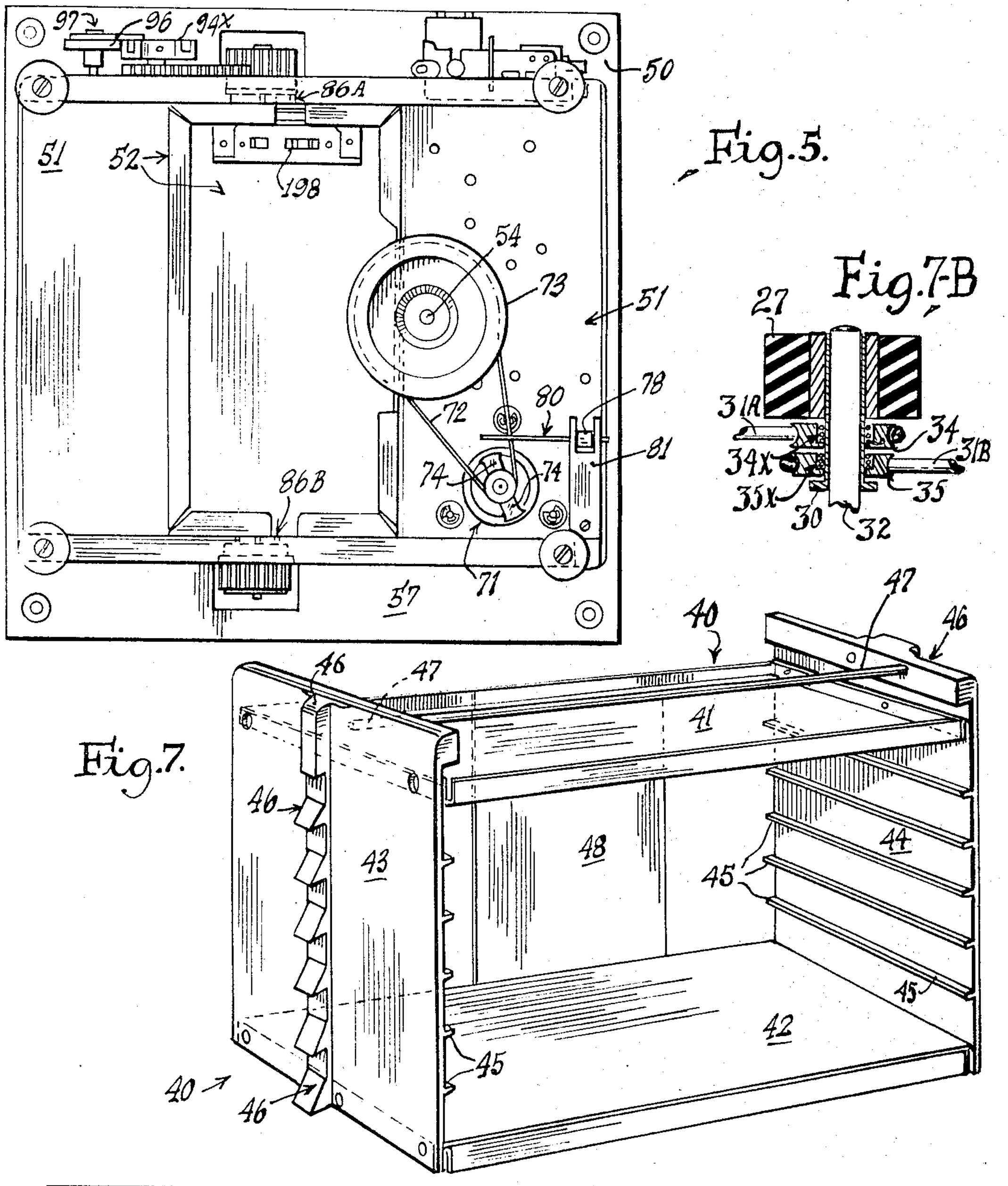
Fig.5. Fig.7-B Fig.7.
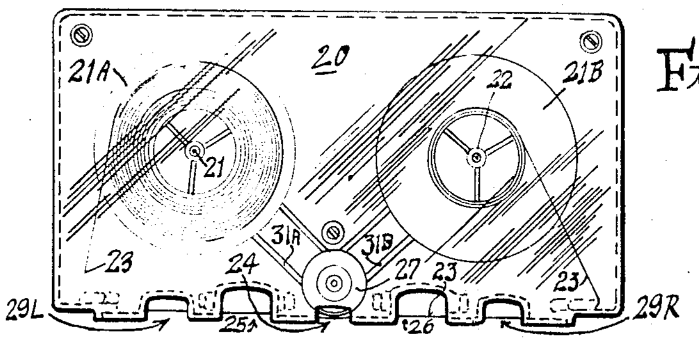
Fig.7A.
INVENTORS.
JERRY O. KELLEY &
EUGENE M. MILLER
BY [signature]
ATTORNEY.

SHIFTABLE MAGAZINE SOUND TAPE CARTRIDGE APPARATUS

INVENTORS.
JERRY O. KELLEY &
EUGENE M. MILLER
BY
[signature]
ATTORNEY.

United States Patent Office 3,453,397
Patented July 1, 1969

3,453,397
SHIFTABLE MAGAZINE SOUND TAPE CARTRIDGE APPARATUS

Eugene M. Miller, Crystal Lake, Ill., and Jerry O. Kelley, Lake Ozark, Mo., assignors, by mesne assignments, to Cart-Trac, Inc., Chicago, Ill., a corporation of Illinois Filed Sept. 19, 1963, Ser. No. 309,974
Int. Cl. G11b 5/78
U.S. Cl. 179—100.2 25 Claims

ABSTRACT OF THE DISCLOSURE

Apparatus for transducing sound tapes enclosed in a plurality of cartridges, the cartridges being housed in a removable magazine. The magazine is insertable into a chamber in the apparatus and shiftable into a plurality of positions, each position aligning a different cartridge with the transducing means. After alignment the selected cartridge is expelled from the magazine and pressed into engagement with a fixed capstan and the transducing means.

This invention pertains to sound-tape equipment and has as its general object the provision of a magazine-type of transducing mechanism adapted to be loaded with a plurality of sound tape cartridges of the reel-to-reel variety which are stacked in a portable magazine readily deposited in a well or chamber formed as part of a sound deck on which are situated one pair of sound heads and a single tape-driving capstan.

In its more detailed aspects automatic means operative cyclically causes ejection of one of the cartridges from the magazine partially onto the deck and into transduction position relative to the sound heads and urges the tape into driving engagement with the capstan, which will be driven in one particular direction by the capstan motor until the end of the sound track is reached, at which time control circuits automatically reverse the motor to transduce a second sound track running in the opposite direction.

On reaching the end of the second or reverse sound track, the cartridge is automatically returned to the magazine, and under optional circuit arrangements the magazine may be moved to the next position and the next cartridge ejected, and so-on until the capacity of the magazine is exhausted (usually six cartridges), corresponding to a condition in which the magazine or carrier is fully lowered into the well or chamber.

If continuous operation is not desired, the optional control provides for automatically stopping the machine and terminating the cycle on restoration of a cartridge to the magazine.

Among some of the more detailed objects and improvements inherent in the disclosed sound tape apparatus are the combination of an accurate step-by-step magazine-positioning mechanism and cooperative cartridge-ejecting and return means acting to urge and hold the tape cartridge in a proper driving engagement with the capstan roller or spindle; the provision of a portable cartridge magazine adapted for ready insertion and removal from the machine and including a gear rack structure cooperative with a Geneva-controlled positioning means for advancing the magazine from one cartridge level to another; and a driving mechanism and selective control circuit means more particularly characterized hereinafter and operative to effect the removal of any cartridge from playing position and substitution of another repeatedly until the selections in the magazine are exhausted.

Still further features include the provision of means automatically muting the loudspeaker system to suppress annoying sounds otherwise attending the various circuit-switching, tape-driving and cartridge movements involved in the operation of such apparatus.

Additional objects and aspects of novelty and utility relate to details of the construction and coaction of the combination and subcombination of instrumentalities comprising the illustrative embodiment described hereafter in view of the annexed drawings in which:

FIG. 5 is a bottom plan view of the lower deck looking along lines 5—5 of FIG. 4, and showing particularly the capstan flywheel pulley, change-speed pulley, and the magazine limit switch at the bottom of the well;

FIG. 7 is a perspective view to enlarged scale of the cartridge magazine;

Figure 8:
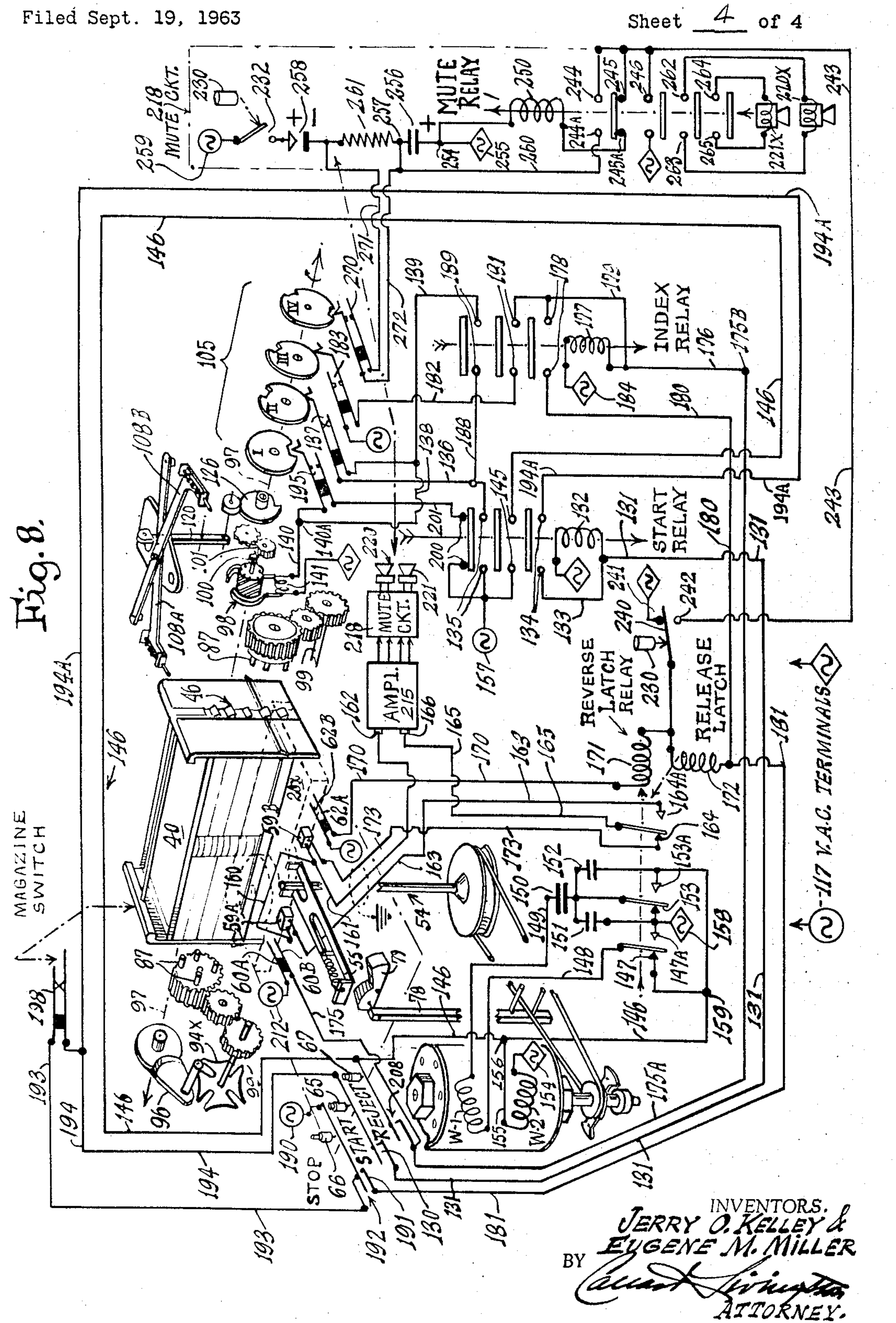

FIG. 7–A is a top plan view of one of the tape cartridges;

FIG. 7–B is a vertical sectional detail of the capstan roller and reverse pulley clutches, shown to enlarged scale;

FIG. 8 is a combination pictorial and schematic operating and circuit diagram;

The sound tape apparatus disclosed is adapted to utilize a reel-to-reel tape cartridge having a construction such as depicted in FIG. 7–A herein. Such a cartridge consists of a shallow rectangular two-piece cartridge case 20, preferably constructed of a transparent plastic by molding and containing a pair of spindles 21, 22, respectively receiving tape reels 21A, 21B between which the tape web 23 passes through a guide channel past a plurality of side openings or windows for exposure to the sound heads and the capstan roller. Within the casing is a pinch roller 27 with its periphery exposed through a window 24 and the tape web passing thereover, the web also being exposed through flanking windows 25, 26, and windows 29L, 29R.

The sound tape is travelled at a substantially constant speed by means of a special clutch mechanism formed as a part of the pinch roller 27 in the manner illustrated in FIG. 7–B. A bushed sleeve 30 rotates with the pinch roller on the spindle 32 and a pair of pulleys 34 and 35 respectively drive one of the tape reels 21A or 21B by means of belts 31A and 31B. The clutch pulleys are uni-directional, but drive in opposite directions through corresponding reversely wound helical clutch springs 34X, 35X, respectively seizing with the pinch-roller bushing 30, so that one of the two tape reels is always positively driven in one direction while the companion reel runs free.

Cartridges of the class described are loaded into a magazine 40 such as shown in FIG. 7, comprising top and bottom walls 41, 42, respectively attached to end wall plates 43, 44 of identical construction and preferably formed by molding from synthetic plastics in such manner that each carries a plurality of parallel horizontal shelf ledges 45 on its inside face aligning with the like ledges on the other, together with a vertical rack of ratchet or gear teeth 46 on its outer face. Each end plate also has a thickened upper portion overlying the top plate with suitable socket holes to receive a metal handle rod 47 offset from the centerline to balance the magazine for manipulation in loaded condition owing to inherent off-center imbalance in the individual cartridges. One side of the magazine is open and the other is partially closed by a plate 48 to prevent escape of cartridges.

Figure 1:
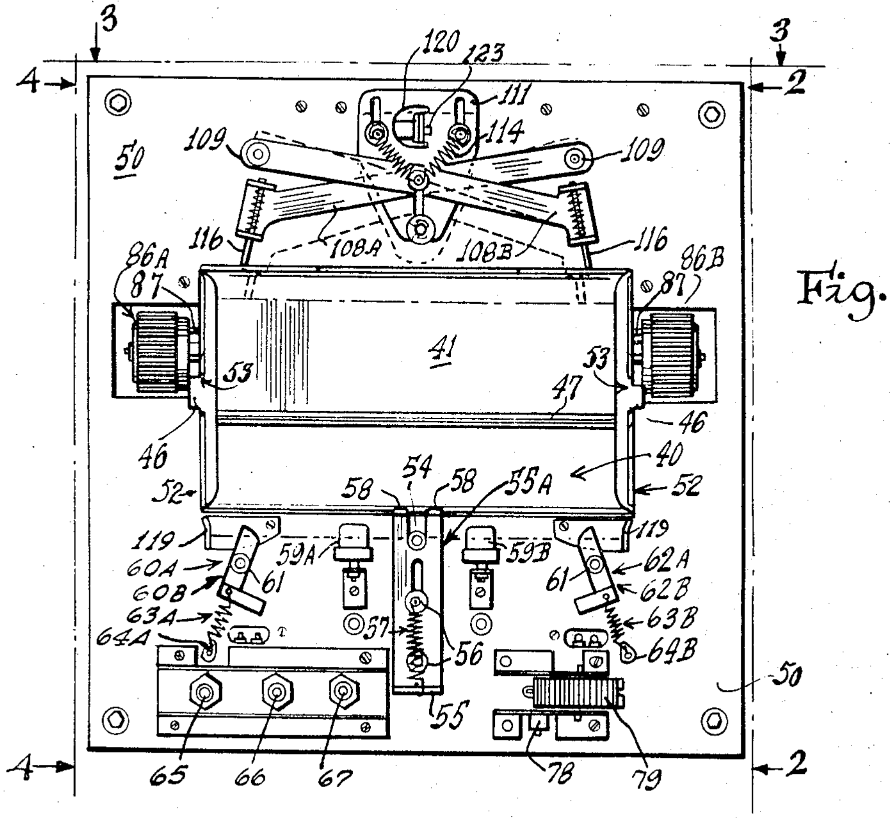
FIG. 1 is a plan view of the top of the apparatus showing the sound deck.
Figure 2:
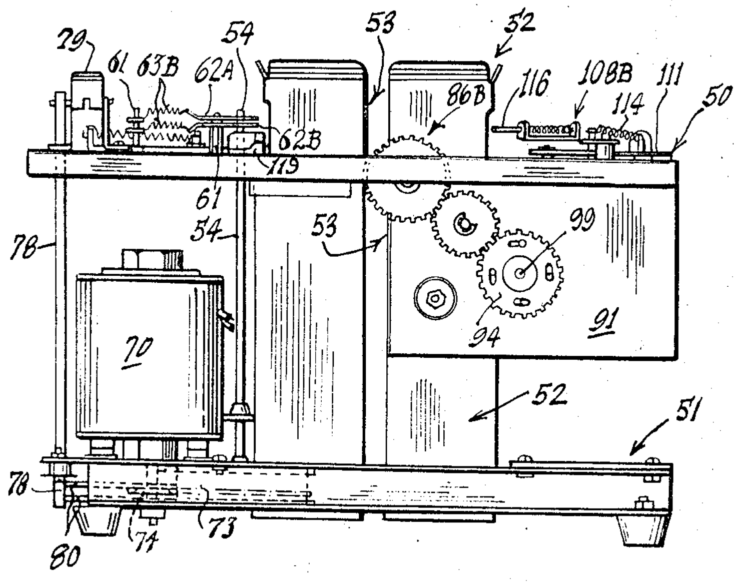
FIG. 2 is a side elevation looking in the direction of lines 2—2 of FIG. 1, showing parts of the magazine well, the magazine advancing gears, and the capstan motor.

The magazine sound tape machine, as depicted in FIGS. 1 and 2, comprises a metal chassis including a top deck 50 and a lower or bottom deck 51 with a central and vertically opening magazine well 52. As viewed in FIG. 2, the opposite sides of this well each have a vertically extending opening or slot 53 into which the respective gear racks 46 fit for cooperation with the magazine-advancing means. FIG. 1 shows the magazine disposed in the well, while FIG. 2 does not.

Opposite the open side of the magazine on the top deck, as seen in FIG. 1, is a tape-driving capstan spindle 54 embraced by the guide yoke 55A of cartridge-restoring slide 55 guided by pins 56 and urged by a spring 57 to thrust the two upturned toes 58 on the yoke prongs against a cartridge (in the manner illustrated in FIG. 8) for the purpose of returning a cartridge to the magazine at the appropriate time.

On opposite sides of the capstan spindle are sound heads 59A, 59B, each intended to transduce one of the two sound tracks impressed on the tape, depending upon which head is connected in circuit and the direction of travel of the tape.

Flanking the two sound heads are pairs of pivoted tape-end or reversing feeler contacts 60A, 60B at the left, 62A, 62B at the right, respectively positioned to bear against the travelling tape web through a corresponding one of the cartridge windows 29L, 29R, FIG. 7A.

Referring to FIG. 2, each feeler contact assembly consists of an insulated pivot post 61 upon which are pivotally secured and insulated from each other a pair of parallel contact fingers 60A, 60B, or 62A, 62B, the free ends of which enter the cartridge windows 29L, 29R to bear against the tape web and ultimately engage a short length of metal foil adhesively applied near the desired end point of the tape in a manner to short-circuit or interconnect the two contact fingers, the opposite free ends of which are connected respectively to conductive springs 63A, 63B, which in turn connect to conductive terminal pieces 64A, 64B. The springs serve to normalize or orient the tape-riding ends of the fingers and also as movable conductors.

Three manual control switches 65, 66, and 67 are disposed in a barnacle housing on the deck at the left of the cartridge-return slide 55.

As viewed in FIGS. 2 and 5, the capstan drive means comprises a reversible constant-speed motor 70 mounted with its rotor shaft upright on the lower deck and penetrating below the deck to engage a change-speed pulley 71, FIG. 5, which drives a large fly-wheel pulley 73 through a belt 72, said change-speed pulley being of a known type having pitched wings 74, which will engage the belt when the belt is flexed upwardly or downwardly by deflecting means 80 to be described, and cause the belt to ride onto a different diameter of the pulley (see FIG. 8 also). The fly-wheel pulley 73 is fast on the lower end of the capstan spindle 54, which, as in FIG. 2, extends vertically through the upper deck for driving engagement with the tape web when pressed against the capstan by the pinch roller in the cartridge, as previously explained.

Means for changing the capstan drive speed (usually from 3.75 inches per second to 7.5 i.p.s. or vice-versa) comprises a vertically slidable shift rod 78, pivotally pinned to a manual rocker lever 79 on the top deck, FIGS. 1 and 2, the operation of which will cause said rod to shift upwardly or downwardly, depending upon which way the rocker lever is pushed, the lower end of said rod passing beneath the lower deck (FIGS. 2 and 5) where it is engaged with fork prongs 80 straddling the drive belt in its yoke. A simple blade spring 81, FIG. 5, centralizes the shift rod so that the prongs 80 do not ride the belt, but when the manual rocker lever on the top deck is pushed one way or the other, one of the prongs will deflect the belt correspondingly so that the pitched pulley wings 74 throw it from one pulley diameter to the other, the belt having sufficient flexibility to drive on either diameter.

Means for moving the magazine one step at a time to dispose the cartridges opposite the sound deck and eject and withdrawn the same from playing or transducing position opposite the sound heads and capstan, comprises a pair of cogs 86A, 86B, each having a set of four cog or drive pins 87 projecting from the side thereof, as illustrated in FIG. 8, to engage the ratchet or rack teeth 46 of the magazine, said pins being set so that each quarter-turn of the cog wheel will cause the magazine to descend into the well the distance necessary to dispose the succeeding cartridge in exact alignment with the deck level, preparatory to partial expulsion into playing position, as will more fully appear.

Figures 3, 4, 6:
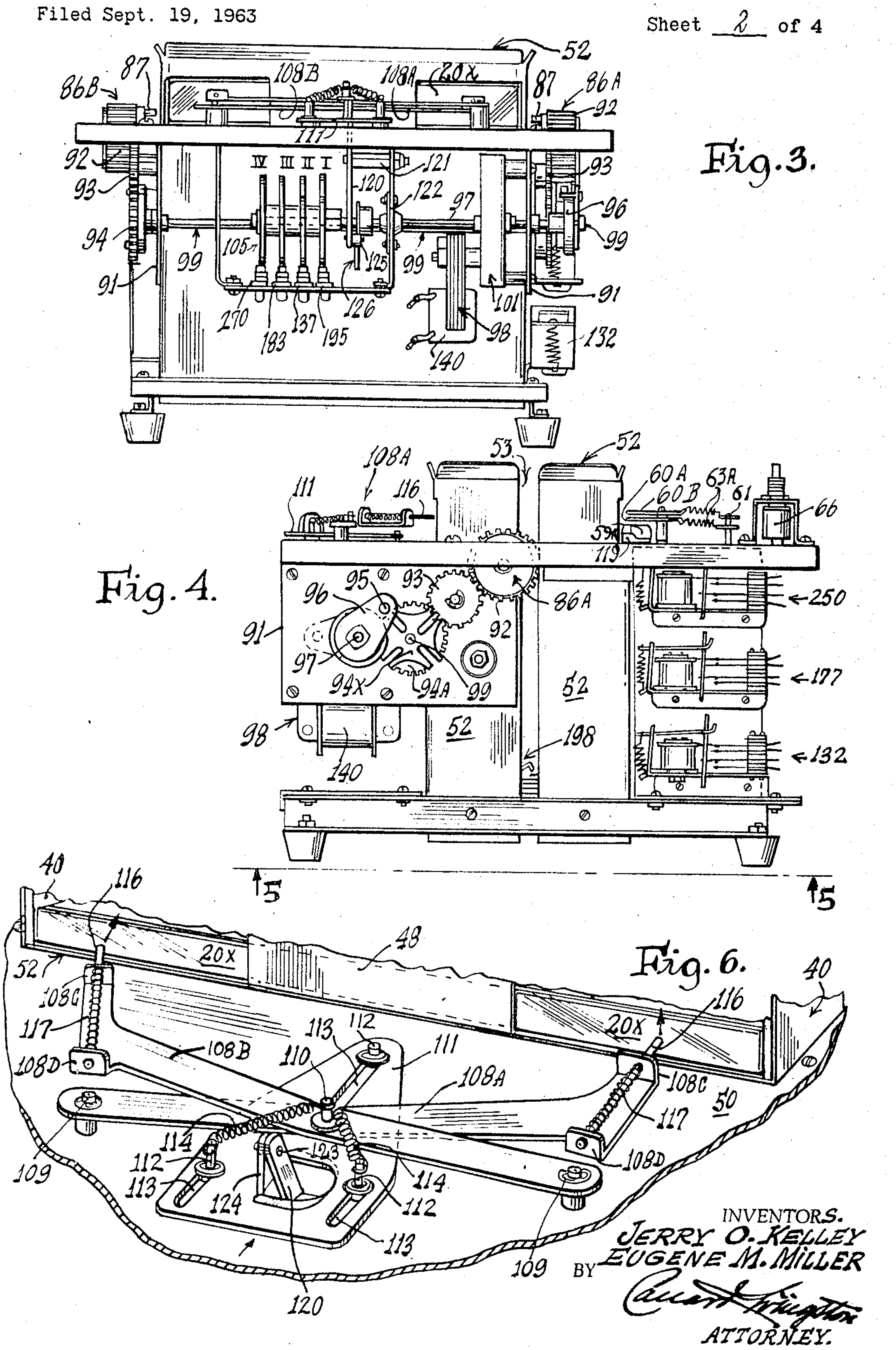
FIG. 3 is a rear elevation showing the magazine cycling motor and control cams, as seen along line 3—3 of FIG. 1.
FIG. 4 is a side elevation opposite from that of FIG. 2 looking along lines 4—4 of FIG. 1, and depicting the Geneva drive, the magazine well, and certain control relays.
FIG. 6 is a fragmentary perspective detail to enlarged scale, of the cartridge ejecting mechanism.

The magazine cogs are respectively journalled in plates 91, FIGS. 2 and 4, attached to the chassis, and upon which are also respectively journalled an appertaining train of drive gears 92, 93, 94A, 94B. The gear 94A in FIG. 4 is provided on its side with a Geneva gear 94X adapted to be driven in quarter-turn steps by a drive pin 95 on a drive pawl 96 fast on shaft 97, which, as in FIG. 3, is the output shaft of a small reduction-gear motor 98 carried at the rear of the chassis beneath the top deck.

The Geneva gear 94X, FIG. 4, and its train gear 94A are fast on a cross shaft 99 which extends entirely across the rear of the chassis to engage with the like train gear 94B on the opposite side, so that both gears 94A, 94B (and the Geneva) are driven in step by the motor-driven pawl 96 on the timer shaft 97.

Thus, for each revolution of the timer shaft 97 and its pawl, the Geneva advances one-quarter turn and steps the magazine cog correspondingly to lower the magazine into the well the distance of one magazine level. It may be observed here that the drive shaft 97 also drives a set of timing cams I, II, III, and IV, generally indicated at 105 in FIG. 3, as will appear more fully hereafter.

Means for automatically ejecting cartridges from the magazine in its successive positions in the well, comprises (FIGS. 1 and 6) a pair of crossed lever arms 108A, 108B, each pivotally anchored at one of its ends, as at 109, on the top deck, and pivotally interconnected near their mid-regions by pin means 110 fixed on a slide plate 111 guided and secured on the top deck by means of other pins 112 fixed in the deck and cleared by parallel slots 113 in the slide plate. Springs 114 are respectively anchored at one end on one of the plate pins 112 and at their opposite ends on the crossed-lever pin 110, in such manner that the springs tend to pull the slide plate back away from the magazine well, and thereby pull the crossed levers similarly away from the well and rear of the magazine and the exposed rear wall portion of any cartridge 20X, FIG. 6.

At their respective ends remote from their anchored ends, the crossed or scissor levers 108A, 108B are provided with aligned pairs of upset flanges 108C, 108D, respectively pierced to seat corresponding plunger rods 116 yieldingly urged by a spring 117 toward the well and the rear wall of any cartridge in the magazine at the deck level, as in FIG. 6. When the slide plate 111 is moved toward the well, the crossed levers 108 likewise project their free ends and the appertaining plungers 116 toward the cartridge so that the plunger ends bear against the rear wall of a cartridge disposed (e.g. 20X) at the playing level, and will yieldingly push the cartridge a short distance onto the deck and thrust the tape web (backed by its pinch roller 27) against the capstan spindle with the web also firmly riding the two sound heads and travelling against the feeler contact fingers 62A, 62B, and 60A, 60B.

Means for shifting the ejector slide plate 111 to displace a cartridge, as aforesaid, comprises an oscillative rocker lever 120, FIG. 3, pivotally fixed between its ends on a stud 121 carried on a subassembly bracket 122 associated with the control cams previously alluded to. At its upper end, this rocker lever is pivotally interconnected, as at 123, FIG. 6, with an upset lug 124 on the slide plate 111, and at its lower end the rocker lever is provided with a cam roller 125, FIGS. 3 and 8, riding the periphery of a drive cam 126 on timer shaft 97, by means of which the spring-loaded rocker lever is oscillated, as aforesaid, to cause the ejector slide plate 111 to advance toward, and withdraw from, the magazine-well and cartridges, the two springs 114 acting to return the slide in the return phase of the cam cycle.

Whenever the ejecting levers 108A, 108B, retreat from a cartridge in playing position on the deck, such cartridge will automatically be pushed back toward and into the magazine compartment from which it was displaced by the spring-urged action of the return slide 55, FIG. 1. The cartridge is guided into position, and stabilized relative to the capstan and sound heads, by means of a pair of guide flanges or shoes 119, FIG. 1.

*Circuit and operation*

In general, the operation of the device is selective and such that it may be started by operation of the "start" button 65 and will automatically play in succession both channels (one in each direction of tape travel) of each of the six cartridges in the magazine, and shut itself off when the end of the second and last channel of the last cartridge is reached, and said cartridge is returned to the magazine.

Operation of the machine may be stopped at any time by pushing the "stop" button 66, and such stoppage is always attended by return of the cartridge being played at that time to its place in the magazine, and by the advance of the magazine to the next cartridge level.

If a cartridge (other than the sixth or last) is in the playing position, another cartridge may be selected by pushing the "reject" button 67, and this operation may be repeated until the sixth and last cartridge is moved into playing position.

The detailed functioning of the apparatus in performing the foregoing selective operations is explained with reference to FIG. 8, the circuit connections of which have been simplified by elimination of many conductors leading to power terminals by the device of representing all electrical power terminal connection by two symbols consisting of a sine wave within a circle for one terminal, and the sine wave within a diamond to represent the other terminal, alternating current being the preferred power source in this instance because of the use of a reversing capacitor-type induction motor 70 to drive the capstan spindle.

Assuming that a magazine 40, fully loaded with its complement of six tape cartridges 20, has been positioned in the well 52, as in FIG. 8, operation of the device may be initiated by pushing the "start" button 65 to close the start switch 130, thereby applying power via conductor 131 to the coil 132 of the Start Relay, which pulls in and sets its own holding circuit via jumper 133 and its own hold contacts 134.

Start relay contacts 135 being now also closed, apply power via conductor 136 the closed motor cam switch 137, conductor 138, junction 140A, conductor 140 to the Index Motor Winding 141, so that this motor starts, causing the reduction gear or timer shaft 97 to turn through approximately 135° until the cam switch 137 opens and stops the Index Motor 98, which has a built-in pinion clutch means 100 for instant stoppage.

As a consequence of the aforesaid starting operation of the Index Motor, and the 135° displacement of the timing shaft 97, the ejector drive cam 126 will be sufficiently turned to rock the lever 120 to its maximum advancing position, thereby thrusting the crossed ejector levers 108A, 108B the maximum distance toward the exposed back wall of the particular cartridge aligned with the deck by the magazine at this time (e.g. cartridge 20X, FIG. 6). When the magazine is first set into the well, it assumes a position in which the first cartridge, i.e. the bottom one at the lowest level in the magazine, will be in alignment with the sound deck in readiness to be displaced from the magazine by the foregoing action of the crossed ejector levers, so that the exposed tape web on the front of this cartridge will be thrust against the capstan spindle 54 and sound heads 59A, 59B.

As a further consequence of the aforesaid operation of the starting switch means 65, 130, and the operation and holding of the Start Relay, the capstan drive motor 70 is always energized to rotate the capstan in a particular or standard (counter-clockwise) starting direction, since the playing or transducing of the second channel in the reverse (left-to-right) direction always leaves the right-hand spool in the cartridge with the tape fully wound-in thereon, when said cartridge is ready to be returned to the magazine, and all cartridges are arbitrarily started in this latter condition, so that the tape must first travel from right to left, and be returned from left to right.

Energization of the capstan drive motor 70, as aforesaid, is effected by closure of contacts 145 on the start relay, applying power from terminal 157 via conductor 146 to junction 156 with conductor 155 to the motor winding W–2; while the other winding W–1 derives power at this time from the same conductor 146 at junction 159, relay contacts 147, conductor 148, said winding W–1 and conductor 149, capacitor 150, relay contacts 153, and opposite power terminal 158. Capacitor 150 has a relatively large capacity of about 3 mfd. to shift the phase for starting with adequate power, the smaller capacitor 151 (and 152 as well) having a low capacity, e.g. about 0.2 mfd., to shunt the relay contacts and protect the latter from the high initial starting voltage surges which would otherwise be damaging.

When the tape is moving from right to left to play the first channel, as aforesaid, one of the transducing or sound heads, e.g. 59B, FIG. 8, will be in circuit with a suitable amplifying means 215 and associated loudspeaker means 220, 221 via a jumper connection 160 (common to both heads), conductor 161 to one input terminal 162 of the amplifier 215, sound head conductor 173, reversing relay normal contacts 164, and conductor 165 to the remaining input terminal 166 of said amplifier.

Under the condition last described, the machine is started with the capstan spindle 54 rotating counterclockwise to drive the tape from right to left and transduce or play the first of its two channels through the left-hand sound head 59B.

On nearing the end of this first-channel and right-to-left run of the tape, a thin strip of adhesively-attached conductive metal foil, such as is commonly supplied near both ends of the tape for reversal or stopping purposes, will pass across the ends of the two right-hand feeler contact fingers 62A, 62B and cause a reversal of the capstan motor and interchange of sound heads, this action occurring as a result of application of power by said feeler contacts to conductor 170 to energize the "setting" or operating coil 171 of the Reversing Latch Relay, thus causing the latter to shift circuits for the capstan motor and sound heads, this relay being of the well-known type which locks up in operated condition, by mechanical latching means (not shown) and may be released (as for return to the condition of FIG. 8) responsive to energization of its release coil 172.

Upon operation of the Reversing Latch Relay, as aforesaid, the sound-head circuit at relay contacts 164 will be shifted to contact 164A, thus disconnecting the first-channel sound head, and interconnecting the second-channel sound head 59A with the amplifier via conductors 165 and 163, the common jumper connection to the amplifier via terminal 162 and conductor 161 remaining unchanged.

Reversal of the capstan motor 70 also occurs at this time as a result of opening of the circuits at relay contacts 147, and 153, and closing of new reversing circuits at contacts 147A and 153A, which connects one terminal of winding W–1 via conductor 149, capacitor 150 and relay contacts 153A to the power terminal 157 at the Start Relay Contacts 145, conductor 146, to Reverse Relay Contact 153A, while the second motor winding W–2 continues to be connected across the same power supply terminals as before. Thus, the only change effected on this motor reversing action is to reverse the power terminal connections to the first winding W–1.

As a result of the foregoing circuit changes effected by the operation (and latching-up) of the Reversing Relay, the tape web will now travel reversely from left to right and be rewound on the right-hand reel, while the transducing and amplifying means 59A, 215, 220 play the recordings carried on the second channel; and when the left-hand end of the tape is finally approached, another conductive signalling means or strip of metal foil near this end of the tape will short-circuit or interconnect the left-hand feeler contact fingers 60A, 60B, which will apply operating power from source 212 to the Index Relay via conductors 175, 175A, to junction 175B with conductor 176 to the coil 177 of the Index Relay and Power Terminal 184, causing this relay to pull in and close a circuit across its contacts 178, thereby momentarily setting up its own electrical holding circuit via jumper 179 and contacts 181, since at this time cam switch 183 will be closed because of the initial 135° movement of the timer shaft; in addition, power will be connected via conductor 180 to energize the release coil 172 of the Reversing Latch Relay.

As a result of the foregoing actuation of the Latch-Release Coil 172, the contacts of the Reversing Relay will fall back to the condition shown in FIG. 8, which restores the circuits for sound head 59B, and the counter-clockwise operation of capstan motor 70 for a subsequent right-to-left travel of the tape in the next cartridge.

Simultaneously with the release or restoration of the Reversing Latch Relay and consequent operation of the Index Relay, as aforesaid, Index Relay Contacts 189 will apply power from terminal 157 via jumper 188 and closed Start Relay Contacts 135, via conductor 139 and jumper 138, to junction 140A with conductor 140 of the Index Motor Winding 141, thereby starting the Index Motor 98 once again and causing the shaft 97 and magazine pawl 96 to resume travel from the dotted-line "playing" position, FIG. 4 (displaced 135° from the full-line starting position of FIG. 4), back to said full-line starting position, with a consequent quarter-turn of the Geneva gear, this operation being attended also by retraction of the cartridge-ejecting levers 108, and concurrent pushing of the cartridge back into the magazine by the Return Slide 55. However, the Geneva driving pawl 96, on reaching its home or starting position as shown in full lines in FIG. 4, does not stop at this time, but continues on through a full revolution back to the dotted-line 135° position with a consequent lowering of the magazine to the next cartridge level, and the ejection of the corresponding new cartridge into playing position.

The foregoing full-cycle operation of the timing motor 98 and its shaft 97 and drive pawl 96 is initiated by operation of the Index Relay and closure of its contacts 189; but the Index Relay drops out almost immediately after operation owing to the opening of the holding circuit by cam switch 183; but since cam switch 137 closes on starting of the timer motor by the Index Relay, and continues the application of power to the timer motor via jumper 138, the motor will run until cam II turns through a full 360° to open said cam switch 137 once again, which results in stopping the timer motor and its shaft 97 with pawl 96 again in the 135-degree "Playing" position (dotted lines, FIG. 4). At this time the capstan motor 70 will be reversed by unlatching and return to normal of the Reversing Relay, and the connections to the appropriate sound head will be effected for transducing the new cartridge.

Thus, it will be seen that the foregoing full-cycle displacement of the timer shaft 97 and pawl 96 will be repeated whenever the Index Relay is operated, until the magazine has been moved through its full range of six positions, the Reversing Relay means serving under control of the tape-end signals in each instance to establish the appropriate transducing circuits and directional travel of the tape for the several sound track or channels carried by such tape.

When the magazine has descended into the well to its limit at the last level, i.e. with the uppermost and sixth cartridge at the deck level, the bottom of the magazine will engage and actuate a magazine Limit Switch 198, arranged at the bottom of the magazine well, as in FIG. 5, thereby opening the power supply circuit normally extended from terminal 190, connecting to the Stop Switch and its normally closed contacts 192, which feed conductor 193, so that power is disconnected from conductor 194 and the Start Switch 130, and also (via the branch conductor 194A) from the contact means 134 of the Start Relay, thereby disabling all three of the Start, Stop, and Reject Switches and effectively shutting off the machine until such time as the magazine switch is permitted to close again, as by removal of the magazine for replacement by another (or by restarting) the same magazine at the starting position at the top of the well for a repeat operation.

The operation of the device as described thus far affords automatic transducing of the full complement of six cartridges in the magazine merely by operation of the Start Switch Button.

In the event that it is desired to stop the machine during the transducing of any of the cartridges, operation of the "Stop" control button 66 will open the stop switch 192, thereby disconnecting the power supplied from terminal 190, and therefore (via conductor 193, limit switch 198, conductor 194A) disconnect such power from the holding contacts 134 of the Start Relay, dropping the latter and restoring to closed condition the normal contacts 200 on the Start Relay, which will automatically connect carry-over operating power from source terminal 157 to the Index Motor via conductor 201 and the timer cam switch 195 at the instant the cam switch 137 opens at what would otherwise be the normal termination of the timer shaft revolution in the particular operating cycle which is to be stopped or interrupted by the presently-described actuation of the Stop Switch Button 66.

As a result of the aforesaid closure of the normal start relay contacts 200 and the carry-over cam switch 195, the timer shaft will make a complete cycle, and the particular cartridge being played at the moment the stopping operation is initiated will be restored to the magazine (as a result of withdrawal) to normally-retracted position of the crossed ejector levers 108A, 108B and the restorative thrust of the spring return slide 55; and in addition, the magazine will descend to the next level (unless it has already reached the last level) at which time the carry-over cam switch 195 will open and the equivalent of a normal cartridge-changing cycle will have been completed, and the relays and cam switches will stand again in the necessary starting conditions depicted in FIG. 8, corresponding to a stoppage of the machine in readiness for the initiation of a new operating cycle, it being especially noted that all normal stoppages of the machine (unless the last or sixth level has been reached) will leave the magazine moved to the next level with the next and correspondingly new cartridge in readiness to be ejected at that level the next time the Start Switch is operated; and even at the sixth and last level, a stoppage which interrupts the playing of either channel of the last cartridge, also will result in a return of said cartridge to its place in the magazine.

It will also be observed, that whenever the Stop Means is actuated as aforesaid the circuit at stop switch 192 from power terminal 190 is shifted to contact 191, so as to apply power to conductor 181 and actuate the Latch Release Coil 172 of the Reversing Relay in case the stoppage is effected while the tape is travelling from left to right back onto the right-hand spool. If such is not the case, this stopping energization of the Latch Release Coil will have no effect and the stopping operations will otherwise proceed as described.

In the event it is desired to interrupt the playing of any cartridge (other than the sixth and last) to effect a new selection by replacing such cartridge with another at the next succeeding magazine level, the Reject Button 67 may be operated to close the Reject Switch 208, which will apply power from supply terminal 157 at the Start Relay (holding in operated condition to close its contacts 145) via conductor 194A, 146 through the Reject Switch 208, conductor 175A, to junction 175B and conductor 176 to energize the coil 177 of the Index Relay, thereby starting the Index Motor via Index Relay Contacts 189, conductor 139, and the jumper 138, to winding 141 of said motor, with the result that the Geneva drive pawl 96 will be turned through a full 360° to cause restoration of the particular magazine being played to the magazine, and movement of the magazine to the next level, and ejection of the corresponding new cartridge into playing position in substitution for the one "rejected," as aforesaid.

Because the sensitivity of the amplifying means for loudspeaker reproduction of the tape signals is very high, a variety of annoying clicks and noises generally attend the various switching operations involved in the several starting, stopping, and reversing functions described, and a suppressing means is provided for automatically muting the audio or loudspeaker circuits momentarily during the critical circuit-changing operations, such means being designated in FIG. 8 by the legend "Mute Ckt." applied to the block diagram 218 interposed between the output of the amplifier 215 and the dual loudspeakers 220, 221, with the actual muting circuit and speaker connections shown in detail at the right of FIG. 8. While the suppressing means is highly desirable for music and most other types of program recorded on the tapes, switching means is nevertheless provided for cutting the muting apparatus out of the circuit, as will appear more fully hereafter.

Referring to FIG. 8, the muting circuit comprises mainly a Muting Relay cooperable with the Reversing Relay, in operating periods of short duration controlled by a timing capacitor and a further cam switch means controlled by cam IV on the timer shaft, with contacts on the Muting Relay closing momentarily to short-circuit the voice coils of the loudspeakers.

The circuit and operations heretofore described in view of FIG. 8 contemplated the condition in which the muting means was optionally cut out of the circuit. In order to put the muting circuit into operation it is merely necessary to actuate the control button 230 of a cut-out switch to close a power circuit at contacts 232 supplying a rectifier 258, and to shift contact 240 from contact 241, supplying power to the two coils of the Reversing Relay, to contact 242 connecting said coils via conductor 243 to contacts 244, 245, and 246 on the Mute Relay, the coil 250 of which has one terminal connected to Mute Relay contact 245A which is normally connected by the relay to the conductor 243 from said changeover switch, the remaining terminal of Mute Relay coil 250 being connected at junction 254 with the power terminal 255, and one side of a timing capacitor 256. The opposite terminal of the capacitor connects at junction 257 with a resistance 261 of about 8,200 ohms value in series with a suitable rectifier 258 connecting with the opposite power terminal 259. A jumper 260 from junction 257 connects with relay contact 244A and will be connected through the companion contact 244, when the relay pulls in, to the conductor 243 to the Reverse Relay coil. Thus, the Mute Relay coil 250, when in use, is always in series with the power supply to both the Latch or Operating Coil 171, and the Release Coil 172 of the Reversing Relay, so that the Mute Relay will pull-in or operate whenever the Reversing Relay is either operated or released.

When the Mute Relay pulls in as aforesaid, the operating circuit to its coil 250 is broken at contacts 245A and the relay would instantly drop out but for the concurrent connections of the capacitor 256 across this coil 250 at the "make" contacts 244–244A. The capacity of the capacitor 256 (e.g. about 30 mfd.) is selected in relation to the resistance of the coil 250 to provide a time delay in discharging across said coil amply sufficient (e.g. 10 seconds) to hold this relay energized for the maximum duration of the changeover in the circuits associated with the sound heads and reversals of the capstan motor.

While the Mute Relay is held operated during the timed interval determined by the Capacitor 256, the loudspeaking means comprising, in the illustrative embodiment, a pair of speakers 220, 221, will be disabled or silenced by contacts held closed by the Mute Relay, the contacts 262, 263 being shunted across the voice coil 220X of one speaker, and the contacts 264, 265 being shunted across the voice coil 221X of the other speaker.

The resistor 261 is included in series with the timing capacitor to protect the circuit from exposure to the full voltage in case of failure of the rectifier or the capacitor, and in order that the capacitor may be very quickly recharged in readiness for a succession of switching operations effected in rapid sequence, the resistor 261 is shorted out of the charging circuit by a momentary closure of the cam switch 270, connected across the resistor by conductors 271, 272, as each cycle of the timer shaft 97 nears completion, said switch being transiently closed for about 3 seconds by the notch in cam IV as the cycle ends.

In this connection it may be observed that the Index Motor 98 is of the variety adapted to stop instantly upon deenergization, such motors being well-known in the art and usually provided with an automatic brake means or clutch means or both, the preferred motor as depicted in FIG. 8 being of the clutch type in which the rotor 98 is shiftable along its axis to engage a clutch pinion 100 with the reduction gear means 101.

We claim:

1. Sound tape apparatus comprising a magazine receptacle; a portable magazine receivable in said receptacle and adapted to contain a plurality of sound-tape cartridges disposed in a series therein, said cartridge being of a type having tape exposed for driving engagement with a capstan and with a transducing means, the magazine affording a cartridge passage on a particular side thereof, said receptacle permitting movement of the magazine along a path extending in the direction of serial disposition of the cartridges therein; means providing a cartridge support at one side of said path confronting the cartridge-passage side of the magazine; a tape-driving capstan and transducing means disposed on said support for operative engagement respectively with the exposed tape in a cartridge moved onto the support into a transducing position relative thereto; electrically-controlled drive means for rotating the capstan; electrically-controlled magazine-moving means operable in transducing cycles to move the magazine step by step along said path from a predetermined starting position in the receptacle to successive positions of alignment with said support each disposing one of the series of cartridges in each cycle in juxtaposition with the support for movement from the magazine into the transducing position thereon and back again into the magazine; electrically-controlled cartridge-moving means operable in each of said transducing cycles to expel a juxtaposed cartridge by substantially linear displacement thereof from and back into its place in the magazine into and out of said transducing position; and control means comprising manually-operated switch means including a starting switch; electrically-controlled cycling switch means including a cycling switch; and tape-controlled switching means, and connections for all of said switch means in a control circuit with said electrically-controlled capstan drive means, said cartridge-moving means, said magazine-moving means and a source of operating power, such that actuation of the starting switch will initiate a transducing cycle for effecting, in the order named, movement of a cartridge from the magazine into transducing position, driving the capstan to travel the tape relative to the transducing means, actuation of the cartridge-moving means under control of the tape-controlled switch means to return the cartridge to the magazine, and termination of the transducing cycle under control of said cycling switch means in readiness for initiation of another such transducing cycle.

2. Sound tape apparatus according to claim 1 in which said control circuit includes a limit switch connected therein and disposed to be actuated responsive to movement of the magazine into a last position in said receptacle corresponding to the alignment of the last cartridge of the series with said support, whereby the control circuit is disabled from initiating a further cycle until the magazine is removed from said last position.

3. Sound tape apparatus according to claim 1 in which the tape is wound from one coil to another therein, and the capstan drive comprises a reversible electric motor, and said control circuit includes electrical reversing-switch means and reversing connections with said motor and the tape-controlled switch means operable to reverse the motor and direction of travel of tape automatically once during each said cycle.

4. Sound tape apparatus according to claim 3 in which said reversing switch means and circuit connections with the control circuit are operable to cause the motor to drive the capstan in the same particular direction at the conclusion of each cycle with the tape thereby wound about a particular one of the two spindles in the cartridge as a result of the reversal effected as aforesaid in each cycle, so that the tape in each cartridge carried by the magazine is always wound directly to begin travel in the same particular direction, and said reversing circuit connections are always conditioned at the conclusion of each said cycle to drive the capstan to effect travel of tape in said particular direction at the commencement of each cycle.

5. Sound tape apparatus according to claim 3 in which said reversing switch means and reversing circuit means are connected for cooperation with said control circuit means for operation to cause the capstan drive motor always to drive the tape correspondingly in the same certain direction in each transducing travelling of the tape which immediately precedes that operation of the apparatus which will return a cartridge to the magazine.

6. Sound tape apparatus according to claim 3 in which the tape in the cartridges has different sound tracks transducible dependently upon the direction of travel of the tape, and said transduicng means includes directionally-responsive circuit connections and transducer switching means connecting in said control circuit for operation to condition the transducing means for operation in correspondence with the direction of tape travel determined by the direction of rotation of the capstan motor.

7. Sound tape apparatus according to the foregoing claim 1 in which said control circuit includes a manually operable stopping switch and connections controlled thereby for terminating any transducing cycle prior to the normal conclusion thereof, and to cause return of a cartridge in transducing position back into the magazine by said cartridge-moving means prior to the conclusion of the terminated cycle and in a manner leaving the apparatus in condition for initiation of a new transducing cycle except in those operations in which the magazine is disposed in a last limiting position in the receptacle.

8. Sound tape apparatus according to the foregoing claim 1 further characterized in that said control circuit includes a manually operable reject switch means and reject circuit connections controlled thereby operable to interrupt and conclude any transducing cycle prior to its normal conclusion under control of the cycling switch means, and including action of the cartridge-moving means to return the cartridge from the transducing position to the magazine, and to initiate a new cycle including movement of the magazine and positioning of a different cartridge in transducing position, except in those conditions of the apparatus in which the magazine occupies a last limiting position in the receptacle at the time the reject switch means is actuated.

9. Sound tape apparatus according to the foregoing claim 1 in which said magazine comprises a receptacle including opposite front and rear sides with adjoining opposite end walls, the front side being open from top to bottom to permit insertion and removal of cartridges, and said end walls have on their respective inner sides aligned cartridge-supporting means in sets at levels one above another, said sets respectively seating one of the series of cartridges to be lodged in the magazine at an appertaining level, and said rear side of the magazine includes a blocking member preventing escape of cartridges from that side but including open portions opposite each said cartridge level for admission of cartridge-ejecting means comprising part of said cartridge-moving means moving toward the magazine in a direction to engage and dislodge a cartridge through said open front side toward said transducing position.

10. Sound tape apparatus according to claim 9 further characterized in that said opposite end walls of the magazine are provided with vertically-extensive gear rack means respectively cooperable with cog means operable to move the magazine along said path in steps each calculated to dispose one of said cartridge levels at said aligned position.

11. Sound tape apparatus according to claim 1 in which said cartridge support comprises a deck elevated above a lower limit of movement of the magazine in said receptacle and the latter opens into the deck such that the magazine may descend into the receptacle from starting position with a first and lowermost one of the cartridges therein aligned in juxtaposition with said transducing position, and the magazine descends in successive steps each aligning one of the succeeding cartridges with the deck for movement as aforesaid into and out of transducing position; and the cartridge-moving means includes ejecting lever means on the deck movable into the magazine through said open portions thereof in a direction to engage, push and hold a cartridge in transducing position with the tape in operative engagement with the capstan and transducing means, and said cartridge-moving means further includes a spring-driven return member tensioned by advance of the cartridge into transducing position by the lever means and acting upon withdrawal of said lever means from the magazine and engagement with the cartridge, to move the cartridge back into the magazine.

12. Sound tape apparatus according to claim 11 in which the magazine receptacle includes opposite vertical sides each having a vertical slot parallel to the path of movement of the magazine, and the magazine has a pair of opposite end walls each provided with a vertical gear rack fitting into one of said slots to guide the movement of the magazine along said path, and the magazine-moving means comprises a pair of cogs each positioned to rotate in operative engagement with one of said racks, together with gear means on a common shaft respectively driving the cogs in step, a Geneva gear driving said shaft, a pawl rotatable to turn the Geneva gear once per revolution, and a motor driven timing shaft rotating said pawl in predetermined synchronism with said cycling switch means to move the magazine one step per transducing cycle until the magazine reaches a limiting position in the receptacle.

13. In a sound tape machine, a horizontal support for a tape cartridge, a tape driving spindle on said support, a transducing device on the support in predetermined alignment with the spindle; means providing a vertical magazine guide adjoining said support; a magazine movable in said guide and adapted to contain in vertical sequence therein tape cartridges of a type having exposed tape portions cooperable with said spindle and transducing device for transducing purposes by urgence of such magazine toward the same into a transducing position to press the exposed tape thereagainst; means for moving said magazine to position any cartridge therein in alignment with said support; first displacing means operable to enter one side of said magazine and engage and displace a cartridge aligned with said support from an opposite side thereof a predetermined distance onto the support in a direction toward and against said spindle and transducing device to press the tape thereagainst for the purposes aforsaid; and second displacing means operable to engage and move a displaced cartridge in said transducing position in a direction away from the spindle and transducing device toward and back into the position in the magazine from which said cartridge was displaced.

14. In a sound tape apparatus, in combination, a plurality of tape cartridges each comprising an oblong container including a pair of tape winding spindles and a pinch roller revoluble therein with peripheral portions exposed through open side portions of the container, tape being wound to travel from one said spindle to the other over said roller by action of a capstan spindle pressing against the tape on the pinch roller, said container also having open side portions exposing the travelled tape for cooperation with transducing means; a box-like magazine having a plurality of cartridge compartments arranged one above another and each opening through a particular side of the magazine such that any cartridge may be moved into or out of its compartment therethrough; means providing a transducing support for a cartridge and means on the support including a capstan spindle and transducing means situated for operative engagement with exposed tape portions of a cartridge disposed in transducing relation thereto; means supporting said magazine movably relative to said transducing support for positioning to align any said cartridge compartment with the support for movement thereon into and from transducing relation with the capstan spindle and transducing means as aforesaid; and reciprocable means positioned respectively on opposite sides of the magizine along the direction of movement of cartridges onto and from the transducing support, and operative in cyclic cooperation interdependently to move a cartridge from its compartment onto the transducing support and back into said compartment.

15. In a sound tape machine of the magazine type, a movable magazine adapted to contain a plurality of flat, rectangular tape cartridges arranged one above another, said magazine having a particular side affording entry and egress for said cartridges; guide means providing a vertical path of travel for said magazine from a starting position to a terminal position; means providing a transducing deck at a side of said guide means and path closely proximate to said starting position and onto which cartridges aligned therewith by the magazine are adapted to be positioned one at a time by displacement of the cartridge from said particular side of the magazine; tape-driving means and transducing means situated on said deck in the path of movement of a cartridge displaced as aforesaid and respectively adapted to be operatively engaged by tape in the displaced cartridge as a result of force acting on the cartridge in a direction toward said driving and transducing means to press the tape thereagainst.

16. Apparatus as set forth in claim 15 further including mechanism operable to move said magazine from said starting position toward said terminal position in steps into and out of intermediate positions in each and every of which positions one of said cartridges is aligned with said deck for movement onto and from the same to press the tape thereof into and out of operative engagement with the tape driving means and transducing means as aforesaid.

17. Sound tape apparatus according to claim 16 further characterized by the provision of means supported in alignment with said transducing position, but on a side of the path of travel of the magazine opposite therefrom, operably driven in timed relation with said magazine-moving mechanism for engaging a cartridge aligned with the deck and urging the same from said particular side of the magazine to press the tape of said cartridge into operative engagement with said tape-driving and transducing means at times when the magazine is at rest.

18. Sound tape apparatus comprising a chassis, means defining a horizontal sound deck at an upper level on the chassis, means defining a magazine well opening into the deck and descending therebelow, a cartridge magazine receivable in said well and movable therein from an elevated starting position to a lower limiting position; means in the magazine for receiving a plurality of tape cartridges in uniformly spaced positions one above another therein for individual sidewise movement relative to one particular side of the magazine, said magazine providing sidewise entrance and exit for each of the cartridges into and out of the magazine at said particular side thereof; means on the magazine cooperable with a step-by-step mechanism for moving the magazine in steps, each equivalent at least to the vertical thickness of one cartirdge, from said starting position to said limiting position: drive means operable in transducing cycles and actuating said step-by-step mechanism to move the magazine one step in each cycle; a tape-driving capstan and transducing means on the deck at that side of the well which confronts said sidewise exit and entrance for the cartridges in the magazine; a capstan motor driving said capstan; cartridge-ejecting and returning mechanism on the deck including a first means moving into an advanced condition from a starting position into the magazine to engage and move a cartridge aligned by the magizine with the deck a predetermined distance onto the deck and into a transducing position for operative engagement of exposed tape portions with said capstan and transducing means; and a second means operative in each cycle to effect reverse movement of a cartridge from the transducing position back into its position in the magazine dependently upon movement of said first moving means back from said advanced condition to said starting position, said cartridges being of a type including tape exposed for engagement with said capstan and transducing means and having tape-end signalling means near opposite ends of the included tape; a capstan motor driving said capstan; a timer motor and cycle switch means actuated in transducing cycles by the timer motor; means providing a synchronizing driving connection between the timer motor and the magazine-moving means for actuating the latter once per transducing cycle; tape-end sensing-switch means actuated by said tape-end signalling means; a control circuit including as components manually-actuated starting switch means, electrically-controlled switch means and circuit connections for said components with said capstan motor, said timer motor, said cycle switch means and said sensing switch means, operable to initiate a transducing cycle responsive to actuation of the starting switch means and to conclude such cycle following actuation of the sensing switch means by a tape-end signal, each cycle including the ejection of a cartridge from the magazine into transducing position at the commencement of the cycle, and restoration of the cartridge to the magazine near the conclusion of the cycle followed by movement of the magazine to dispose a succeeding cartridge into aligned juxtaposition with the deck in all cycles excepting one terminated when the magazine is in said limiting position.

19. Apparatus according to claim 18 in which said capstan motor is reversible and said control circuit includes electrically-actuated reversing-switch means controlled by said sensing-switch means and connected with said capstan motor and acting to reverse the latter once during each transducing cycle whereby to rewind the tape oppositely from the direction in which it is travelled by the capstan prior to the occurrence in said cycle of the tape-end signal which produces the aforesaid reversal of the capstan motor.

20. Apparatus according to claim 19 further characterized in that said tape has at least two sound tracks transducible dependently upon the direction of travel of the tape, and said transducing means includes transducing circuits each connectible to transduce one of said sound tracks, and said control circuit includes transducer switching means controlled by said reversing switch means to selectively connect for operation a transducing circuit appropriate to the direction in which the tape is travelled by said motor and capstan at any particular time under control of the reversing switch means, as aforesaid.

21. In a sound tape machine, a chassis including a sound deck having a tape-driving capstan and transducing means located at a transducing station thereon; means part of said chassis defining a magazine well descending from an opening adjoining said station; a portable magazine receivable for movement vertically in said well from a starting position at the top thereof, said magazine adapted to contain a plurality of vertically spaced tape cartridges and providing for sidewise passage of said cartridges out of and into the same to and from said transducing station; step-by-step magazine driving mechanism proximate to the well; driven means on the magazine operatively engageable with said step-by-step mechanism throughout the range of movement of the magazine in the well beginning with said starting position and into a terminal position of the magazine therein; said step-by-step mechanism being operable to move the magazine one step at a time from the starting position to said terminal position and each step aligning one of said cartridges with said transducing station.

22. In a sound tape machine, first means for supporting a tape cartridge in a particular horizontal transducing position, second means defining a vertical magazine guideway adjoining said transducing position; a unitary portable magazine movable vertically in said guideway and adapted to contain a plurality of tape cartridges vertically arranged therein and each of uniform predetermined thickness in vertical dimension; means providing a vertical gear rack at opposite ends of said magazine; a pair of magazine stepping cogs each journalled adjacent one of said gear racks for driving engagement therewith; means coupling said cogs for joint rotation; and motor-driven means including intermittently acting drive means for turning said cogs predetermined uniform angular amounts each sufficient to move the magazine from a starting position to a terminal position in steps each equivalent to thickness of one magazine relative to said transducing position and to stop the magazine in a position adapted to align one of said cartridges with said transducing position.

23. In a sound tape machine, means providing a sound deck with a transducing station to receive a sound tape cartridge of the type having tape exposed at its side for driving engagement with an upright capstan spindle and a transducer; a box-like magazine adapted to contain a plurality of said tape cartridges in vertically sequential arrangement and affording passage for each cartridge sidewise into and out of the magazine at least at one particular side thereof; means providing a vertical chamber communicating at its upper end with said deck and adapted to receive said magazine for movement up and down therein from a starting position with a lower end of the magazine aligned with said deck for movement of the lowermost cartridge sidewise from said particular side thereof onto the deck and into said transducing station; cartridge-moving means on the deck on a side of the upper opening of the chamber opposite from said transducing station and said particular side of the magazine, said last-mentioned means including at least one cartridge-engaging member movable back and forth from a starting position away from the magazine, to an advanced position entered into the magazine and engaging a cartridge aligned by the magazine with the transducing station, and the engaged cartridge displaced onto the deck into said transducing station in operative engagement with said capstan spindle and transducer; together with actuating mechanism for moving said cartridge-engaging member to and from said starting and advanced positions, said magazine having a partial sidewall opposite said particular side thereof affording passage for entry of said cartridge-engaging member to engage any cartridge therein and aligned with the deck.

24. Apparatus according to claim 23 further characterized in that said cartridge-moving means includes two of said cartirdge-engaging members each having a yieldable contacting means thrust thereby against the cartridge to be displaced in advancing movement as aforesaid, said two cartridge-moving members being pivotally joined in a toggle to act jointly, and said actuating mechanism including rotary means and coacting oscillatory means for reciprocating said toggle.

25. Sound tape apparatus comprising a portable magazine adapted to contain a plurality of sound tape cartridges; a guideway in which said magazine is movable up and down; a support for one of said cartridges laterally offset and closely adjacent an upper portion of the guideway; a first means for moving said magazine into successive positions in the guideway in each of which positions a cartridge therein is in alignment with said support; second means movable into the magazine, from a retracted position outwardly thereof, toward an advanced position to engage an aligned cartridge and push the same from the magazine into a predetermined transducing position on the support; tape-driving and transducing means on said support and into operative engagement with which tape carried by a cartridge is pressed by action of the second means in a fully advanced condition thereof; yieldable presser means carried by said second means to engage said cartridge and transmit thereto the thrust of said second means in pressing action as aforesaid; third means yieldingly pressing a cartridge moved onto the support as aforesaid with force sufficient to return such cartridge toward and into the magazine responsive to progressive withdrawal of advancing thrust on the cartridge by said second means; and motor-driven fourth means actuating said first and second means in predetermined synchrony in uniform operating cycles each characterized by an advancing and retractive operation of said second means during an initial phase of each cycle, followed by an operation of said first means prior to termination of the same said cycle.

References Cited

UNITED STATES PATENTS

| | | | |
|---|---|---|---|
| 2,821,576 | 1/1958 | Gaubert | 179—100.2 |
| 2,878,719 | 3/1959 | Lutes | 88—28 |
| 3,083,269 | 3/1963 | Gaubert | 179—100.2 |
| 3,115,810 | 12/1963 | McCammon | 88—28 |
| 3,134,550 | 5/1964 | Camras | 179—100.2 |

BERNARD KONICK, *Primary Examiner.*

J. RUSSELL GOUDREAU, *Assistant Examiner.*

U.S. Cl. X.R.

242—55.13